(12) United States Patent
Nukala et al.

(10) Patent No.: US 9,871,824 B2
(45) Date of Patent: *Jan. 16, 2018

(54) UNIFIED POLICY OVER HETEROGENOUS DEVICE TYPES

(71) Applicant: Microsoft Technology Licensing, LLC, Redmond, WA (US)

(72) Inventors: Chandrasekhar Nukala, Santa Clara, CA (US); David Michael Callaghan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 62 days.

This patent is subject to a terminal disclaimer.

(21) Appl. No.: 14/696,187

(22) Filed: Apr. 24, 2015

(65) Prior Publication Data

US 2015/0237072 A1   Aug. 20, 2015

Related U.S. Application Data

(63) Continuation of application No. 12/916,301, filed on Oct. 29, 2010, now Pat. No. 9,032,013.

(51) Int. Cl.
*H04L 29/06* (2006.01)
*H04W 12/08* (2009.01)
*G06F 21/62* (2013.01)

(52) U.S. Cl.
CPC .......... *H04L 63/20* (2013.01); *G06F 21/6236* (2013.01); *H04W 12/08* (2013.01)

(58) Field of Classification Search
CPC ..... G06F 21/6236; H04L 63/20; H04W 12/08
See application file for complete search history.

(56) References Cited

U.S. PATENT DOCUMENTS

| | | | |
|---|---|---|---|
| 6,158,010 A | 12/2000 | Moriconi et al. |
| 6,807,636 B2 | 10/2004 | Hartman et al. |
| 2004/0250122 A1 | 12/2004 | Newton |
| 2006/0120526 A1 | 6/2006 | Boucher et al. |
| 2006/0184682 A1 | 8/2006 | Suchowski et al. |
| 2006/0294582 A1 | 12/2006 | Linsley-Hood |
| 2007/0192823 A1 | 8/2007 | Andersen et al. |
| 2007/0276907 A1 | 11/2007 | Maes |
| 2008/0059635 A1 | 3/2008 | Seiferth et al. |
| 2008/0183603 A1 | 7/2008 | Kothari et al. |

(Continued)

FOREIGN PATENT DOCUMENTS

| | | |
|---|---|---|
| CN | 1988478 A | 6/2007 |
| CN | 1998219 A | 7/2007 |

(Continued)

OTHER PUBLICATIONS

Office Action received in JP2013-536702, dated Nov. 4, 2015, 4 pages.

(Continued)

*Primary Examiner* — Ranodhi Serrao
(74) *Attorney, Agent, or Firm* — Klarquist Sparkman, LLP

(57) ABSTRACT

A system and method are disclosed for enforcing a normalized set of policy-based behaviors across two or more disparate client devices. The policy definition can be a common description of expected behavior, while a client-side policy engine interprets and implements platform specific details associated with the client. In one embodiment, a client device receives a generic policy definition from a network. The generic policy definition is applicable to disparate device types having different hardware and/or software platforms. A client policy engine can analyze the generic policy definition, compare it to client-side applications or functions and make intelligent decisions on how to apply the policy for the specific client.

20 Claims, 9 Drawing Sheets

(56) References Cited

U.S. PATENT DOCUMENTS

| | | | |
|---|---|---|---|
| 2008/0256593 | A1 | 10/2008 | Vinberg et al. |
| 2008/0276043 | A1 | 11/2008 | Hetzler et al. |
| 2008/0282319 | A1 | 11/2008 | Fontijn et al. |
| 2009/0052372 | A1 | 2/2009 | Durazzo et al. |
| 2009/0222882 | A1 | 9/2009 | Kabat et al. |
| 2009/0228579 | A1 | 9/2009 | Sanghvi et al. |
| 2009/0288111 | A1 | 11/2009 | Park et al. |
| 2010/0064341 | A1 | 3/2010 | Aldera |
| 2010/0122314 | A1 | 5/2010 | Zhang et al. |

FOREIGN PATENT DOCUMENTS

| | | |
|---|---|---|
| CN | 101064670 A | 10/2007 |
| CN | 101789998 A | 7/2010 |
| JP | 2004-094401 | 3/2005 |
| JP | 2009-070086 | 4/2009 |
| JP | 2010-220260 | 9/2010 |
| WO | WO2007/110094 A1 | 10/2007 |

OTHER PUBLICATIONS

"Configuring Managed Devices with Group Policy," Microsoft/TechNet, published Sep. 2, 2009, 2 pages.

Examination Report for EP11836926.3, dated Jun. 23, 2014, 4 pages.

International Search Report and Written Opinion for PCT/US2011/057520, dated Jun. 1, 2012, 9 pages.

Jansen, et al., "Assigning and Enforcing Security Policies on Handheld Devices," In Proceedings of the Canadian Information Technology Security Symposium, 2002, 8 pages.

Notice on the First Office Action, CN201110345021.3, dated Dec. 11, 2013, 12 pages.

Notice on the 2nd Office Action, CN201110345021.3, dated Aug. 5, 2014, 13 pages.

Third Office Action and Search Report Issued in Chinese Patent Application No. 201110345021.3, dated Feb. 2, 2015, 13 Pages.

Supplementary Search Report Received in European Patent Application No. 11836926.3, dated Jun. 5, 2014, 3 Pages.

Office Action Received in Australia Patent Application No. 2011320644, dated Sep. 11, 2014, 3 Pages.

Office Action Issued in Chinese Patent Application No. 201110345021.3, dated Aug. 6, 2015, 12 Pages.

Office Action Issued in Chinese Patent Application No. 201110345021.3, dated Sep. 26, 2016, 9 Pages.

Office Action Issued in European Patent Application No. 11836926.3, dated Mar. 29, 2017, 5 Pages.

Office Action Issued in Japanese Patent Application No. 2013-536702, dated Mar. 30, 2016, 4 Pages.

Gite, Vivek, "Block Outgoing Network Access for a Single User Using Iptables", Retrieved From <<https://www.cyberciti.biz/tips/block-outgoing-network-access-for-a-single-user-from-my-server-using-iptables.html>>, Apr. 4, 2006, 10 Pages.

UNIFIED POLICY OVER HETEROGENOUS DEVICE TYPES

CROSS-REFERENCE TO RELATED APPLICATION

This is a continuation of U.S. application Ser. No. 12/916,301, filed Oct. 29, 2010, which application is incorporated herein by reference in its entirety.

FIELD

The present application relates generally to policy administration, and, more particularly, to administering policy over heterogenous device types.

BACKGROUND

Televisions, phones, game stations, and computers have affected nearly every aspect of modern living. Functionality between such heterogenous devices is merging. For example, computers can be used for voice communications and phones can be used to run applications or play games. With increased functionality comes increased need for management and control. For example, parents want the ability to control which content is viewable by children, how many text messages can be sent, an amount of time consumed in an entertainment activity regardless of the device, hosting in the cloud, etc. Currently, policy settings must be set for each device individually, making it logistically difficult to modify settings dynamically. Even further, policy can be set for each application on a device individually, so that policy adjustments must be made to possibly hundreds of different policy settings if changes are desired. Multiply this with the number of device types used to access common services which include smartphones, television, PC, game consoles, as well as hosted services, one can see it rapidly becomes a complex problem.

Group policy has existed across homogeneous devices (e.g., a group of computers all running the same operating system) and is currently used for Microsoft® Office® 2010. For example, group policy is an infrastructure that is used to deliver and apply one or more desired configurations or policy settings to a set of targeted users and computers. The Group Policy infrastructure consists of a Group Policy engine and several individual extensions. These extensions are used to configure Group Policy settings, either by modifying a registry or setting Group Policy settings for security settings, software installation, folder redirection, browser maintenance, wireless network settings, and other areas. Each installation of group policy consists of two extensions: A server-side extension used to define and set the policy settings applied to client computers and a client-side extension that a Group Policy engine calls to apply policy settings.

Although policy settings are well established across homogeneous devices in a business environment, there still is a need for increased policy settings flexibility across different device types having different underlying platforms made up of unique combinations of hardware, operating systems and unique applications performing disparate or similar functions.

It is desirable, therefore, to increase flexibility of policy settings across device types, platforms, users and/or applications.

SUMMARY

A system and method are disclosed for enforcing a normalized set of policy-based behaviors across two or more disparate client devices or cloud based instances of a virtualized device. The policy definition can be a common description of expected behavior, while a client-side policy engine interprets and implements platform specific details associated with the client.

In one embodiment, a client device receives a generic policy definition from a network. The generic policy definition is applicable to disparate device types having different hardware and/or software platforms. A client policy engine can analyze the generic policy definition, compare it to client-side applications or functions and make intelligent decisions about how to apply the policy for the specific client.

In another embodiment, the client policy engine can consider an identity of a user and/or role of a user (e.g., work, play, adult, child, observer, editor, administrator). Additionally, an activity log can be maintained that can be analyzed and used by the client policy engine to make decisions about client-device activity going forward. Some examples of policy enforcement include tracking time spent viewing entertainment or a number of text messages and email sent and limiting the client device or class of applications across all devices if such parameters exceed policy thresholds.

In another embodiment, policy settings can be controlled remotely using a client device associated with a group, such as being on the same account or from the same household. The changed policy settings can then be pushed to other disparate client devices in the group. For example, a parent can change policy settings using a mobile phone, which can then be pushed down to a gaming console to limit a child's playing time as well as limit PC based and web based gaming with the same setting.

The foregoing and other objects, features, and advantages of the invention will become more apparent from the following detailed description, which proceeds with reference to the accompanying figures.

DETAILED DESCRIPTION

Figure 1:
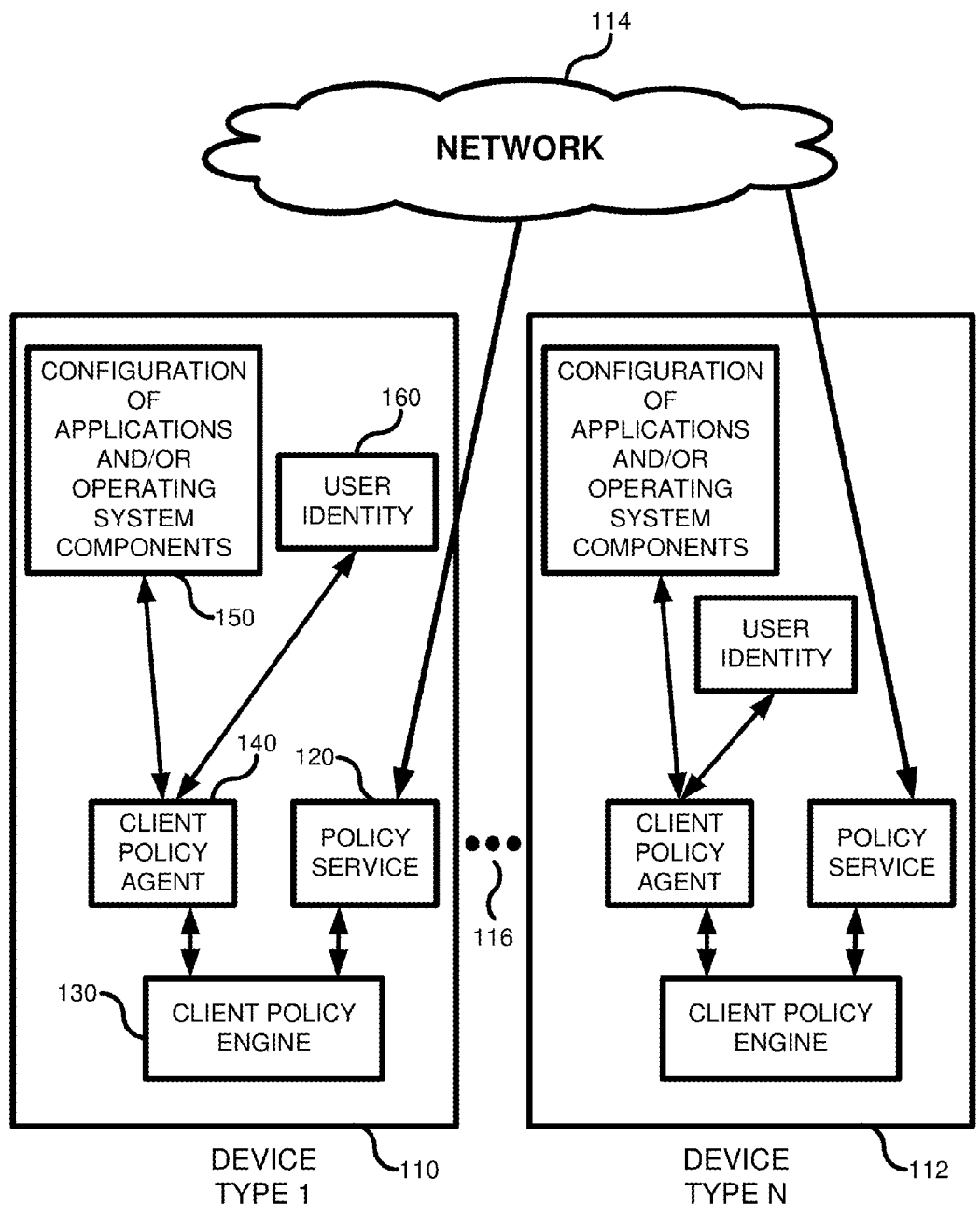
FIG. 1 is an embodiment showing multiple user device types being controlled through a generic policy distributed via a network.

FIG. 1 is embodiment showing a system 100 having multiple user device types 110, 112 communicatively coupled to a generic or uniform policy distributed via a network 114. Any number of user device types and user devices can be used, as indicated by repetition dots 116. The user device types can be heterogeneous, meaning at least some have a different platform than others. A different platform means that some devices run a different operating system, have different hardware structures, and/or have different fundamental functionality and purposes. It should be appreciated that some device types may be virtual instances running locally on a PC, or hosted in the cloud and accessed through a remote terminal. Example heterogenous devices include game stations, phones, computers and televisions. Virtual devices/applications include console emulators and virtualized operating system instances, such as instances of Microsoft® Virtual PC and Microsoft® Virtual Server as well as non Microsoft products such as VM Ware, and cloud services such as web based email and games hosted by Adobe® FLASH or Silverlight® in the browser.

The network (e.g., Internet) 114 can store a generic policy definition for the various disparate devices 110, 112. The network establishes a policy service that provides a common framework to define, evaluate and exchange policy information. As described further below, the policy service further can allow each disparate device to self-heal or automatically adjust parameters and settings when not in conformance with the defined policy.

There are numerous techniques for implementing a client device that has the functionality herein described, and FIG. 1 provides only an example solution. Device 110 includes a policy service 120, which collects a generic policy statement from the network. The generic policy statement can include limits on the client device or applications running on the client device, such as limiting an amount of time used per day, hours of operation, power consumed or rate of consumption, calculations per second, transactions per second, days (e.g., only weekends) of operation or actions that occur in one day. Other limits can also be provided depending on the particular application. For example, email may be permitted for 2 hours when majority of the time is conducted on a PC, but extend to 2.5 hours total if the majority of the time is spent on a device with a touch based keyboard because of the anticipated slower input rate. Limits can also be placed on categories of applications, such as browsers. Policy can also change based on the device capabilities. For example, client applications that require more time for typing emails can be provided more time (e.g., smart phones can be given more time than computers or touch screen phones due to slower typing speeds.) The policy service 120 can pass the generic policy statement to a client policy engine 130, which can be implemented in software, hardware or a combination thereof. The client policy engine 130 adapts the generic policy statement to the particular device 110. Such an adaptation uses information collected from the client device itself. A client policy agent 140 collects the information from memory 150 on the client device that includes client functionality and use, such as the configuration of applications and/or operating system components. The client policy agent 140 can also collect a user identity 160 and modify the functionality available for the client device based on the user identity. The user identity typically includes credentials and can further include a role or mode of operation (e.g., work or play and adult or child) and even biometric identity validation, such as facial recognition, fingerprint scan, voice print, etc. The security of the identity validation can determine the scope of access. For example a child would not be expected to type in a username and password; but instead choose their picture from a list and optionally select the images or shapes that they use to unlock the device. If the child gets the images wrong the device will not erase itself. However if the parent access is entered wrong 5 times the device could be programmed to erase all content. The client device 112 has a similar structure to client device 110, but is adapted to conform to the particular device type of the client.

The example below demonstrates a policy controlling client functionality by permitting games, social network and instant messaging applications on any of the 3 platforms for 2 hrs a night between the hours of 5 and 9 PM.

```
<?xml version="1.0" encoding="utf-8"?>
<Root>
    <Policy platform="Game Station">
        <Mode type="home">
            <Access type="weekday">
                <Start type="UTC-7">17:00:00</Start>
                <Stop type="UTC-7">21:00:00</Stop>
                <Quota>2:00:00</Quota>
            </Access>
            <Application>Games</Application>
            <Application>Social Networking</Application>
            <Application>Instant Messaging</Application>
        </Mode>
    </Policy>
    <Policy platform="Phone">
        <Mode type="home">
            <Access type="weekday">
                <Start type="UTC-7">17:00:00</Start>
                <Stop type="UTC-7">21:00:00</Stop>
                <Quota>2:30:00</Quota>
            </Access>
            <Application>Games</Application>
            <Application>Social Networking</Application>
            <Application>Browser</Application>
            <Application>Instant Messaging</Application>
        </Mode>
    </Policy>
    <Policy platform="PC">
        <Mode type="home">
            <Access type="weekday">
                <Start type="UTC-7">17:00:00</Start>
                <Stop type="UTC-7">21:00:00</Stop>
                <Quota>2:00:00</Quota>
            </Access>
            <Application rating="www.contoso.com/youthgameratings/conservative/Age12.xml">Games</Application>
            <Application>Social Networking</Application>
            <Application>Browser</Application>
            <Application>Instant Messaging</Application>
        </Mode>
        <Exception>xxx-xxx-xxxx </Application>
    </Policy>
</Root>
```

Figure 2:
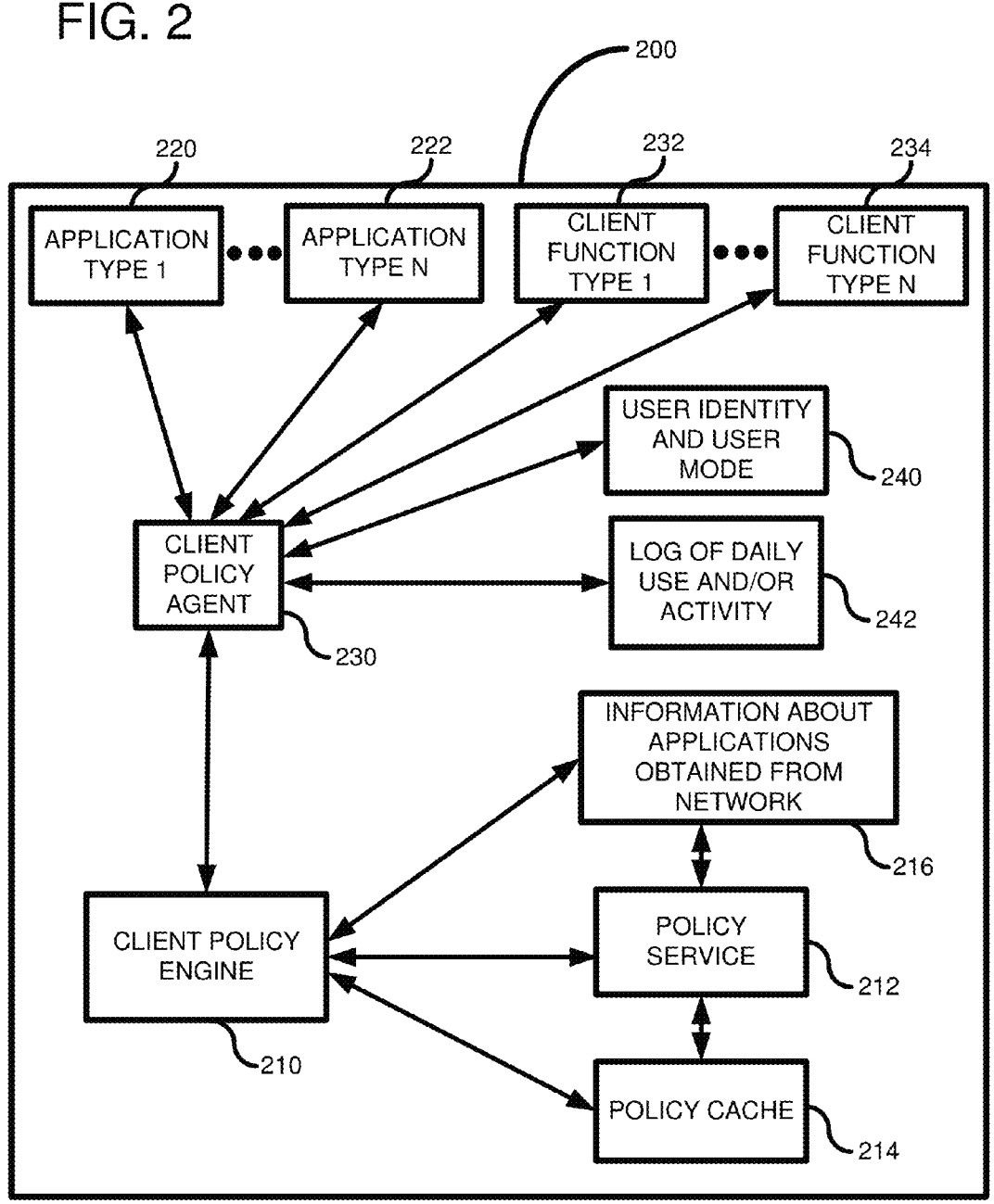
FIG. 2 is an embodiment showing different hardware and software structures that can be used to implement a generic policy over heterogenous device types.

FIG. 2 shows another embodiment with additional functionality and features that can be added to a client 200. In this example, a client policy engine 210 is coupled to a policy service 212. The policy service is coupled to a network (e.g., Internet) as previously described. A policy cache 214 can also be coupled to the policy service 212 and the client policy engine 210 in order to store the policy definition received from the network. Using the cached version of the policy definition allows the client to follow the generalized policy while offline. Memory 216 coupled to the client policy engine 210 can also be available for storing information about applications obtained from the network. Such information can be obtained using the policy service 212 or other means. For example, applications, such as shown at 220, 222, can be games that have an associated age rating. The age rating can be obtained dynamically from the network so that up-to-date age rating information can be obtained for conformity to the policy. Thus, information associated with applications on the client can be obtained from the network and used to make local, client-side policy decisions. A child below the age rating, for example, can be prevented from running the application. The subject invention includes the ability for parents to delegate part of the policy to a 3$^{rd}$ party youth game rating system that has rating values more aligned with their cultural preferences. This is shown for the PC game rating attribute in FIG. 2. It should be appreciated that the subject invention includes defining policy for specific applications such as Flowerz®, with a globally unique URI as well as generic categories of applications that fulfill a common scenario such as Browser as shown in FIG. 2. The specific game policy could restrict the user from running Flowerz® to a predetermined time. Whereas the browser example could restrict all applications on the device that have the capability to browse the Internet. Furthermore, a category of content can be accessed within another application. For example if the user is restricted from playing video games during certain hours of the day, they cannot play video games from within the browser even if those games are hosted by a plugin such as Macromedia Flash® or Silverlight® since the operating system will enforce the policy on the content accessed. Similarly, the access to music may be permitted, but the types of music, such as restricting music with explicit content warnings is enforced for specific users. Finally, policy can be adjusted based on device capability, such as allowing more time for email on devices that typing is inherently slower.

The client policy agent 230 gathers client-side data regarding available applications 220, 222, client functions 232, 234 (e.g., operating system controlled functionality, such as text messaging) user identity and user mode 240, and information about daily use and/or activity 242 and passes such information to the client policy engine. For example, the log 242 can track an amount of time that an application or client function has been used (e.g., game was played for 3 hours today, or browser was used for 2 hours) or a number of times a function was used (e.g., 10 text messages sent or 10 emails sent.) Any of this information can be used to conform the client device 200 to the current policy. The client policy engine can use the gathered information to make intelligent decisions needed to conform the client to the policy. It should also be noted that the applications 220, 222 can be different types (e.g., game, map application, word processing, etc.) and the client functions 232, 234 can be different types of operating system functions. Lastly, the policy engine can process an exception request feature, which allows the requestor to contact the policy administrator for temporary overrides. This is shown by the exception element in FIG. 2. In this system if the user needed more time for email, they could issue a text message to a phone number of the parent requesting more time. A response by the parent to the requesting service would cause an exception to the rule to occur on the device.

Figure 3:
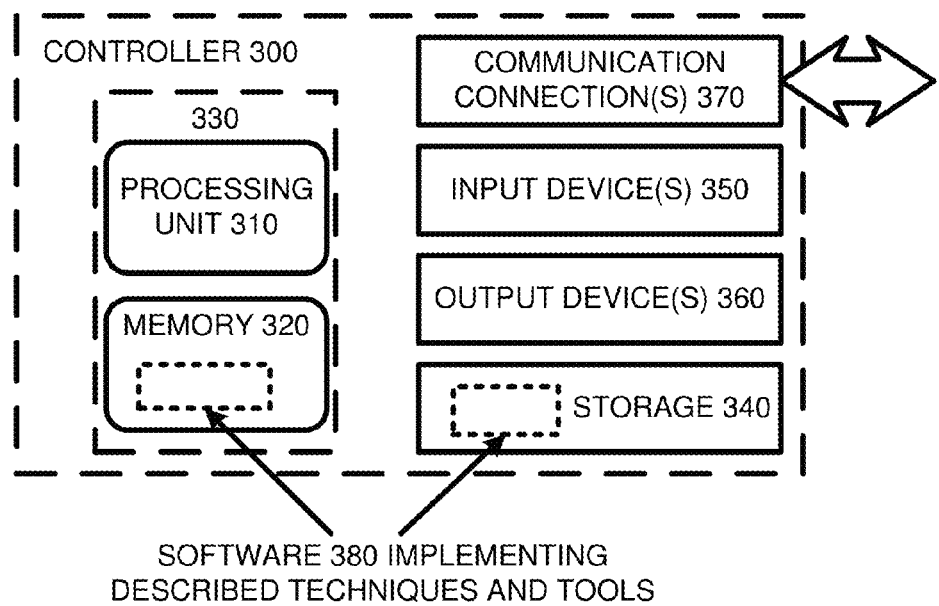
FIG. 3 is an embodiment of a controller that can be used on a client device.

FIG. 3 illustrates a generalized example of a suitable controller 300 in which the described technologies can be implemented. The controller is not intended to suggest any limitation as to scope of use or functionality, as the technologies may be implemented in diverse general-purpose or special-purpose computing environments.

With reference to FIG. 3, the controller 300 can include at least one processing unit 310 (e.g., signal processor, microprocessor, ASIC, or other control and processing logic circuitry) coupled to memory 320. The processing unit 310 executes computer-executable instructions and may be a real or a virtual processor. The memory 320 may be volatile memory (e.g., registers, cache, RAM), non-volatile memory (e.g., ROM, EEPROM, flash memory, phase change memory known as PCM or PRAM, etc.), or some combination of the two. The memory 320 can store software 380 implementing any of the technologies described herein.

The controller may have additional features. For example, the controller can include storage 340, one or more input devices 350, one or more output devices 360, and one or more communication connections 370. An interconnection mechanism (not shown), such as a bus or network interconnects the components. Typically, operating system software (not shown) provides an operating environment for other software executing in the controller and coordinates activities of the components of the controller.

The storage 340 may be removable or non-removable, and can include magnetic disks, magnetic tapes or cassettes, flash memory, PCM, solid state hard drives (SSHD), CD-ROMs, CD-RWs, DVDs, or any other computer-readable media that can be used to store information and which can be accessed within the controller. The storage 340 can store software 380 containing instructions for detecting blood-vessel wall artifacts associated with a catheter position in a blood-vessel wall.

The input device(s) 350 can be a touch input device such as a keyboard, mouse, pen, or trackball, a voice input device, a scanning device, or another device. The output device(s) 360 may be a display, printer, speaker, CD- or DVD-writer, or another device that provides output from the controller. Some input/output devices, such as a touchscreen, may include both input and output functionality.

The communication connection(s) 370 enables communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, microwaves, infrared, acoustic, or other carrier.

Figure 4:
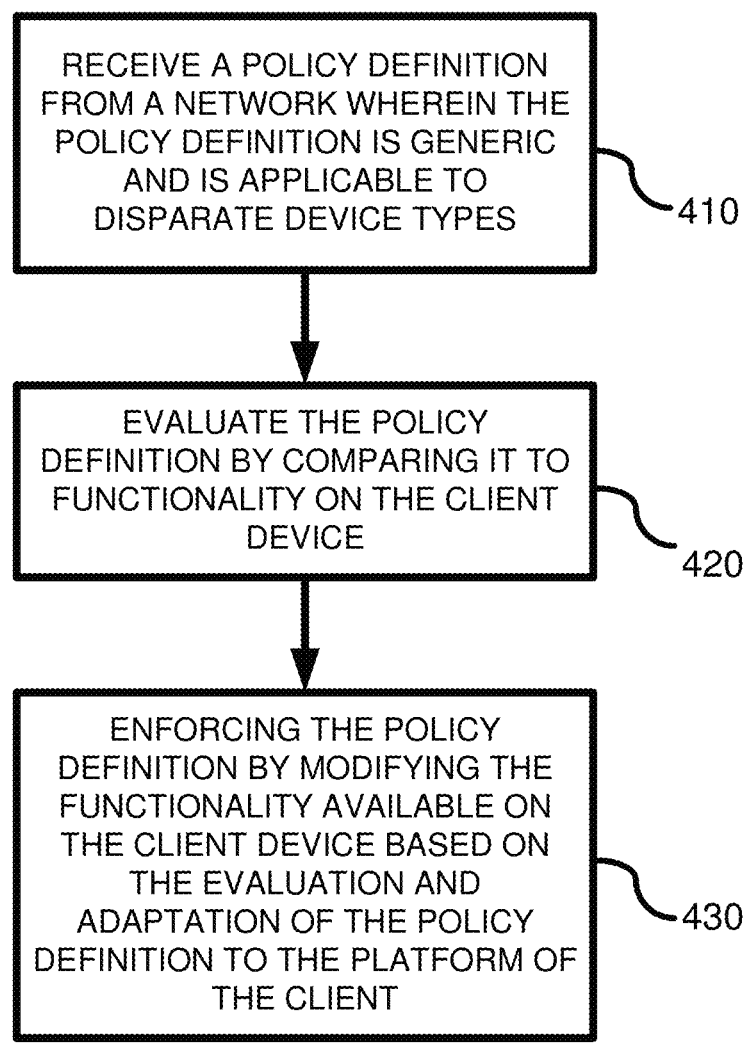
FIG. 4 is a flowchart of a method for implementing a generic policy across heterogenous device types.

FIG. 4 is a flowchart for implementing a policy service across multiple heterogenius device types, as herein described. In process block 410, a policy definition is received from a network. Generally, the policy definition is stored on a server computer coupled to the Internet. The policy definition can be generic, meaning that it is not specifically tailored to a device type or a particular platform. As a result, the policy definition can be applied to different device types, such as gaming consoles, phones, televisions, personal computers, etc. In process block 420, the policy definition is evaluated by the client-side policy engine by comparing it to functionality on the client device. First, the policy definition is searched for a platform statement that matches the client's platform. For example, if the client is a game station, then the policy statement is searched for policy statements associated with game stations. Once the matching platform is found, associated sub-policy statements can be extracted from the policy definition. For example, mode types, access types, start and stop times, a time quota, specific application types that can be accessed (e.g., games, social networking, and browser), and specific functions, can all be read from the policy statement and compared to the current functionality available on the client device by using the current activity log, available applications, user identity, etc. In process block 430, the policy engine can enforce the policy definition by modifying functionality available on the client to conform to the policy. There are numerous techniques for enforcing the policy. For example, the policy engine can perform the evaluation on boot-up and store results in memory for access by the applications or operating system upon a user attempting an operation. Alternatively, each time an operation is attempted, the policy engine can perform an evaluation anew based on current policy settings that are cached or re-pulled from the network. The policy engine can then control or instruct the application or operating system so that desired function is allowed or blocked in order to modify the functionality of the client device.

Figure 5:
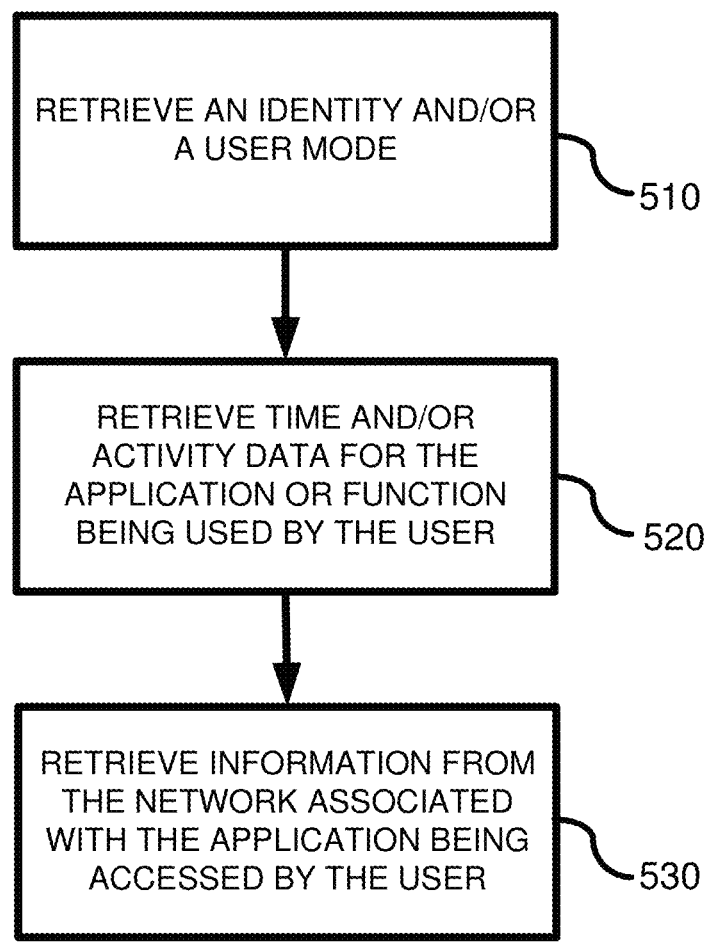
FIG. 5 is a flowchart of a method showing different parameters that can be used in evaluating a policy definition and comparing it to functionality on the client device.

FIG. 5 is a flowchart of a method showing one or more process blocks that can be performed during the evaluation process block 420 of FIG. 4. Functionality on the client device can be determined using the client policy agent to read the available application types, client functions and settings. Additionally, any further information described below can be used in determining the functionality available. In process block 510, a user identity and/or a user mode is retrieved from memory. A user identity is typically associated with login credentials. The policy engine can apply different policies for different users. For example, a child over 13 years of age may be approved to watch PG-13 movies but not R rated movies, while a child under 13 years of age cannot. Additionally, the user mode can be considered. For example, a person in a work mode may have different contact list presented in the application than if in a play mode. Thus, application and user interface settings can change based on the user mode. In process block 520, data can be retrieved regarding time and/or activity for an application or a function being used by a user. As previously described, an activity log can store such data. For example, the user can be restricted to a certain number of hours per day. The time data retrieved from the activity log can be a running total of how much time an application has been active during the day. Likewise, the activity data can indicate how many times a certain event occurred, such as how many text messages were sent in a 24-hour period. Thus, using the activity log, parameters on the client can by automatically and dynamically monitored. Additionally, a quantity of usage can affect available functionality. In process block 530, information can be retrived from the network associated with the application. Thus, a particular application on the client can be identified and such identification can be sent to the network. In response, the network can transmit policy-based information (e.g., current rating) associated with the application back to the client for incorporation into the policy decision making process.

Figure 6:
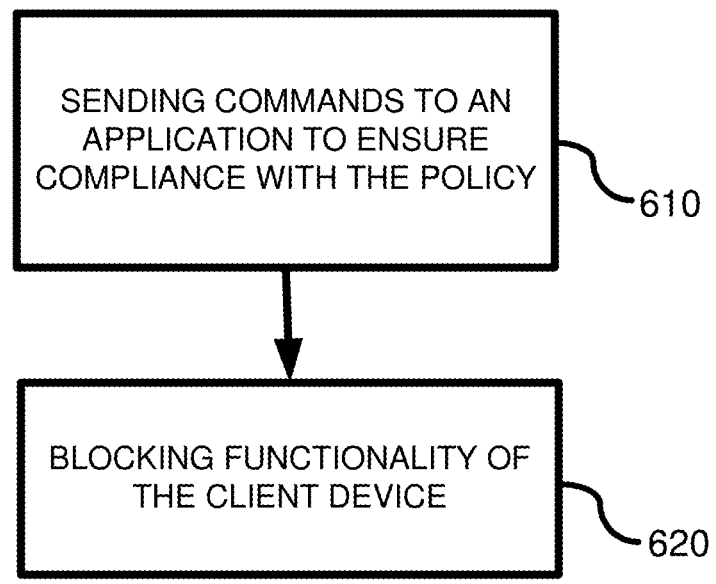
FIG. 6 is a flowchart of a method for enforcing the policy on a client device.

FIG. 6 shows a flowchart of a method further expanding on process block 430 of FIG. 4. There are numerous techniques for enforcing the policy on applications or the operating system and FIG. 6 provides some possibilities. In process block 610, commands are sent to an application or the operating system to ensure compliance with the policy. Thus, for example, an application can receive commands from the policy engine and execute the commands. Once the commands are received the applications comply with the commands until altered. Example commands can include blocking application functionality of features. Process block 620 shows that the policy engine can further block functionality, such as core operating system functionality. For example, the policy engine can block the ability to send text messages or temporarily remove an icon associated with a restricted application.

Figure 7:
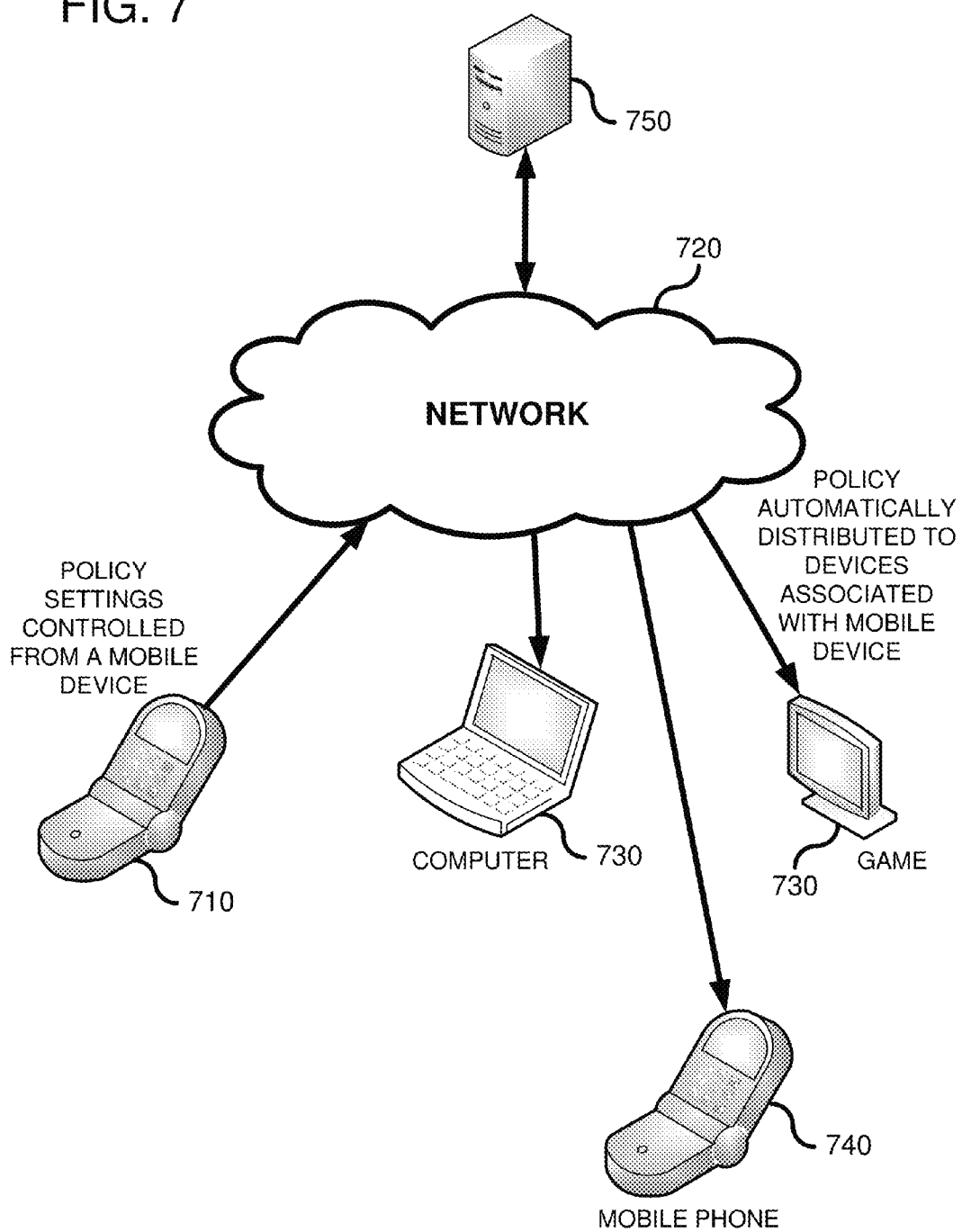
FIG. 7 shows a system where policy settings can be controlled from a member in an associated group.

FIG. 7 shows a system diagram illustrating that one disparate device 710 associated with a user account can upload a generic policy definition to the network 720 and have that policy definition pushed to other disparate devices 730 and similar devices 740, all associated with the same user account. The policy definition can be stored on a server 750, which communicates with the various policy service modules on the client devices. Thus, a parent can use a mobile phone to remotely and automatically change policy settings across all heterogenius and homogenius devices on the same account and control functionality of their children's cell phones, game stations or televisions, and/or computers.

Figure 8:
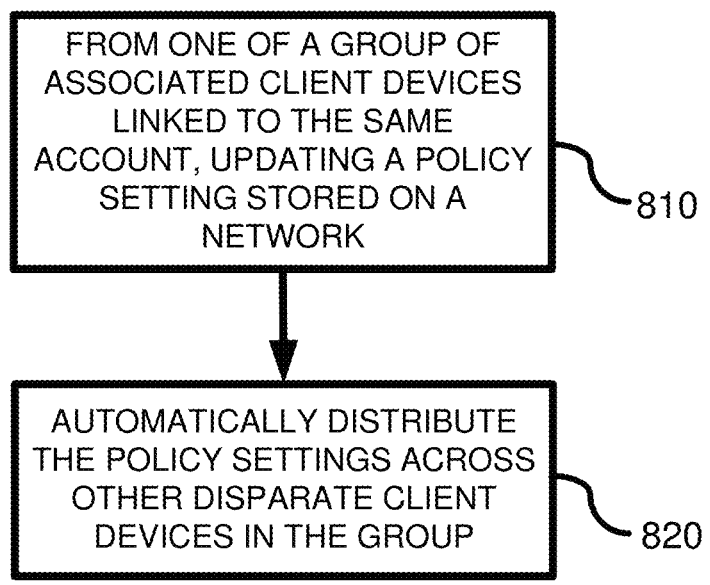
FIG. 8 is a flowchart showing automatic distribution of policy settings using the system of FIG. 7.

FIG. 8 is a flowchart of a method for implementing the system of FIG. 7. In process block 810, one of the devices in a group that is linked to a same account (e.g., a household account) can update policy settings stored on the network. In process block 820, the policy settings are automatically distributed to other client devices in the same account. Thus, a policy update can be dynamically and automatically controlled and distributed by a user.

Figure 9:
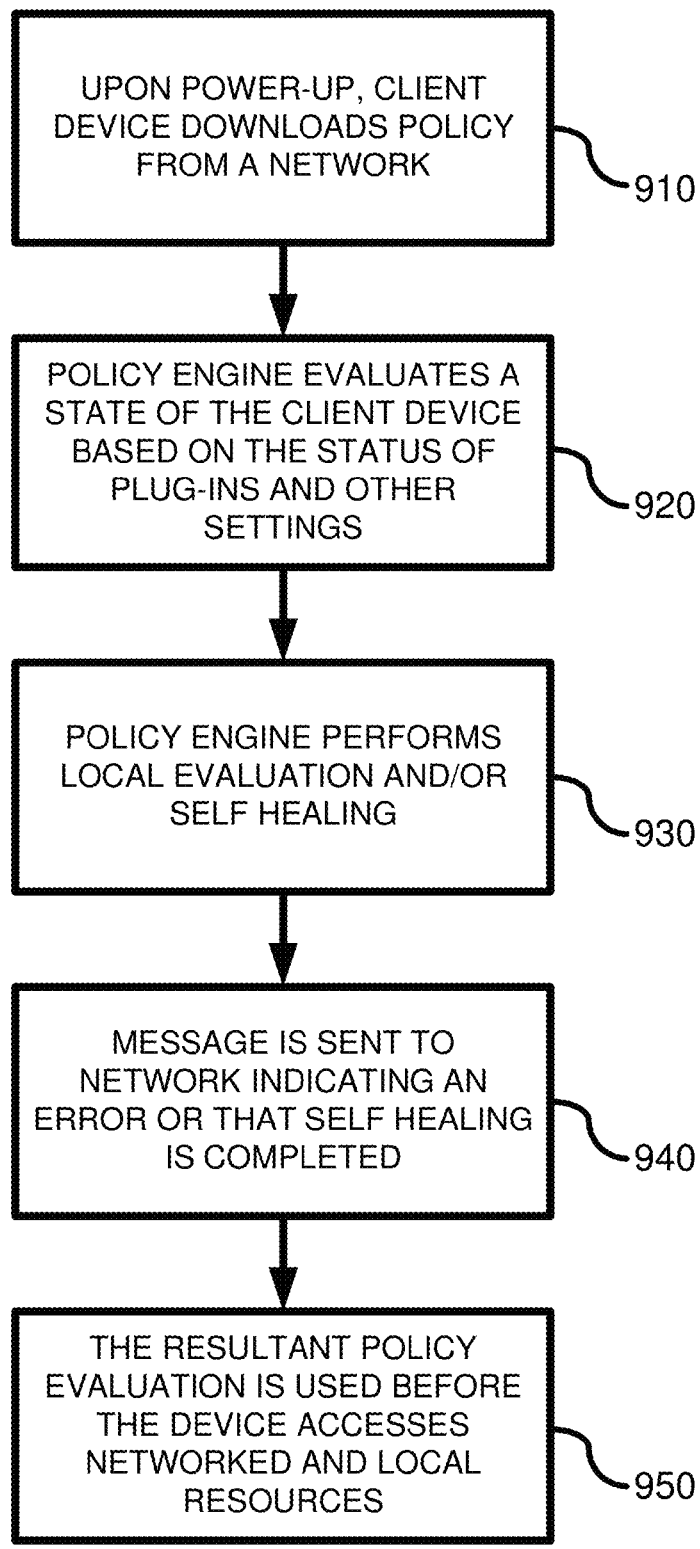
FIG. 9 is a flowchart of a method showing details of a client device using a policy service at power-up.

FIG. 9 is a flowchart showing further details of a method that can be implemented to enforce a generic policy across disparate devices. In process block 910, a client device downloads a generic policy from a network on power-up, such as during a booting process. In process block 920, the policy engine evaluates a state of the client devices based on the status of plug-ins and other settings. In process block 930, the policy engine performs local evaluation and/or self healing, meaning that any applications or functionality that does not conform to the policy is blocked or otherwise disabled. In process block 940, a message is sent to the network indicating that an error has occurred or that self healing is completed. In process block 950, the resultant policy evaluation is used before the device accesses local resources and networked resources (e.g., corporate network, the Internet and applications that use the Internet like Texting, Voice over IP technologies.)

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Pert, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of enforcing a policy on a client device, comprising:
    receiving, in a client device, a policy definition from a network, wherein the policy definition is a generic definition that is applicable to disparate device types having different hardware and software platforms;
    evaluating the received policy definition in a client policy engine located on the client device by comparing the policy definition to use or functionality available on the client device, including configuration of applications or operating system components on the client device;
    requesting, from the network, information about an application located on the client device, receiving the requested information, and using the received information in the evaluation; and
    enforcing the policy by modifying the functionality available on the client device based on the evaluation, wherein the client policy engine adapts the generic policy definition to a specific platform on the client device including adapting the functionality on the client device based on an identity of a user logged onto the client device.

2. The method of claim 1, wherein the evaluation includes determining an identity of a user and modifying the functionality available based on the user identity.

3. The method of claim 1, wherein evaluating includes determining a mode in which a user is using the client device and wherein the mode can be switched between one or more of the following: work and play, adult and child, observer, editor, and administrator.

4. The method of claim 1, further including receiving a policy update sent to the network for distribution of the policy across disparate client devices.

5. The method of claim 1, wherein the client device includes one or more of the following: (a) a gaming console, (b) a mobile phone, (c) a television, (d) a computer, or (e) a virtual instance of any client device (a-d).

6. The method of claim 1, wherein the functionality available can change based on the capabilities of the client device.

7. The method of claim 1, wherein enforcing includes sending commands to an application to control functions thereof or to control content played by the application.

8. The method of claim 1, further including dynamically monitoring parameters on the client device and evaluating whether the client device conforms to the received policy and taking corrective action if the policy is not met.

9. The method of claim 1, wherein the enforcing of the policy includes modifying the functionality on the client device based on an age of the user.

10. An apparatus for enforcing a policy on a client device, comprising:
    a policy service client for receiving a generic policy definition from a network;
    the client device including a controller executing a client policy agent for collecting information about the client device including a usage log stored in memory on the client device that stores previous use information; and
    the client device including the controller executing a client policy engine coupled to both the policy service client and the client policy agent for receiving the generic policy definition from the policy service client and the information from the client policy agent, and for determining whether functionality available on the client device conforms with the generic policy definition by comparing the generic policy definition to the collected information about the client device and determining how to apply the generic policy definition to the client device, wherein how to apply the generic policy definition depends on an identity of a user logged into the client device and wherein applications on the client device limit functionality based on commands from the client policy engine.

11. The apparatus of claim 10, further including a server computer coupled to the client device via the network, the server computer for providing a uniform policy definition across different client device types.

12. The apparatus of claim 10, wherein the policy definition restricts an amount of time an application on the client device can be used in a day.

13. A method of enforcing a policy on a client device, comprising:
    receiving, in a client device, a policy definition from a network, wherein the policy definition is a generic definition that is applicable to disparate device types having different hardware and software platforms;
    evaluating the received policy definition in a client policy engine located on the client device by comparing the policy definition to use or functionality available on the client device, including configuration of applications or operating system components on the client device; and
    enforcing the policy by modifying the functionality available on the client device based on the evaluation, wherein the client policy engine adapts the generic policy definition to a specific platform on the client device including adapting the functionality on the client device based on an identity of a user logged onto the client device, wherein the functionality available can change based on the capabilities of the client device.

14. The method of claim 13, wherein the evaluation includes determining an identity of a user and modifying the functionality available based on the user identity.

15. The method of claim 13, wherein evaluating includes determining a mode in which a user is using the client device and wherein the mode can be switched between one or more of the following: work and play, adult and child, observer, editor, and administrator.

16. A method of enforcing a policy on a client device, comprising:

receiving, in a client device, a policy definition from a network, wherein the policy definition is a generic definition that is applicable to disparate device types having different hardware and software platforms;

evaluating the received policy definition in a client policy engine located on the client device by comparing the policy definition to use or functionality available on the client device, including configuration of applications or operating system components on the client device;

enforcing the policy by modifying the functionality available on the client device based on the evaluation, wherein the client policy engine adapts the generic policy definition to a specific platform on the client device including adapting the functionality on the client device based on an identity of a user logged onto the client device; and dynamically monitoring parameters on the client device and evaluating whether the client device conforms to the received policy and taking corrective action if the policy is not met.

17. The method of claim 16, further including receiving a policy update sent to the network for distribution of the policy across disparate client devices.

18. The method of claim 16, wherein the client device includes one or more of the following: (a) a gaming console, (b) a mobile phone, (c) a television, (d) a computer, or (e) a virtual instance of any client device (a-d).

19. The method of claim 16, wherein the functionality available changes based on the capabilities of the client device.

20. The method of claim 16, wherein applications on the client device limit the functionality based on commands from the client policy engine.

* * * * *